United States Patent [19]

Storchevoi

[11] Patent Number: 4,878,466
[45] Date of Patent: Nov. 7, 1989

[54] PISTON OF AN INTERNAL COMBUSTION ENGINE

[76] Inventor: Nikolai M. Storchevoi, Bratislavskaya, 34, kv. 174, Kiev, U.S.S.R.

[21] Appl. No.: 283,483
[22] PCT Filed: Mar. 19, 1987
[86] PCT No.: PCT/SU87/00032
 § 371 Date: Oct. 28, 1988
 § 102(e) Date: Oct. 28, 1988
[87] PCT Pub. No.: WO88/07132
 PCT Pub. Date: Dec. 22, 1988

[30] Foreign Application Priority Data

Nov. 15, 1982 [SU] U.S.S.R. .............................. 3514116
May 11, 1987 [CA] Canada .................................. 536,779
May 15, 1987 [CN] China ................................. 87103522

[51] Int. Cl.[4] .............................................. F02F 3/08
[52] U.S. Cl. .......................... 123/193 CP; 123/193 P
[58] Field of Search ...................... 123/193 CP, 193 P

[56] References Cited

U.S. PATENT DOCUMENTS 2,208,782 7/1940 Workman ............................ 92/193
3,906,923 9/1975 Harker ........................... 123/193 CP
4,158,328 6/1979 Beardmore ................... 123/193 CP

FOREIGN PATENT DOCUMENTS 0393755 4/1924 United Kingdom .

Primary Examiner—E. Rollins Cross
Attorney, Agent, or Firm—Burgess, Ryan & Wayne

[57] ABSTRACT

A piston of an internal combustion engine having a skirt (1) with a hole (3) to receive a piston pin the axis of which is perpendicular to the axis of the skirt (1) the side surface of which is provided with two recesses (4) arranged at the opposite sides of the piston pin hole axis and having cylindrical surfaces axes of which are parallel with the axis of the skirt (1), the pins receiving inserts (5) having a cylindrical outer surface engageable with the surface of the cylinder (6) of the internal combustion engine, this outer cylindrical surface having a radius of curvature equal to the radius of the cylinder (6) of the engine, and having an inner cylindrical surface of a radius of curvature equal to the radius of curvature of the recess (4), and two springs (7) each disposed between the insert (5) and skirt (1) to urge the corresponding insert (5) to the cylinder (6). The insert (5) has in cross section the shape of a curvilinear wedge with the maximum angle not exceeding the angle of friction thereof.

1 Claim, 1 Drawing Sheet

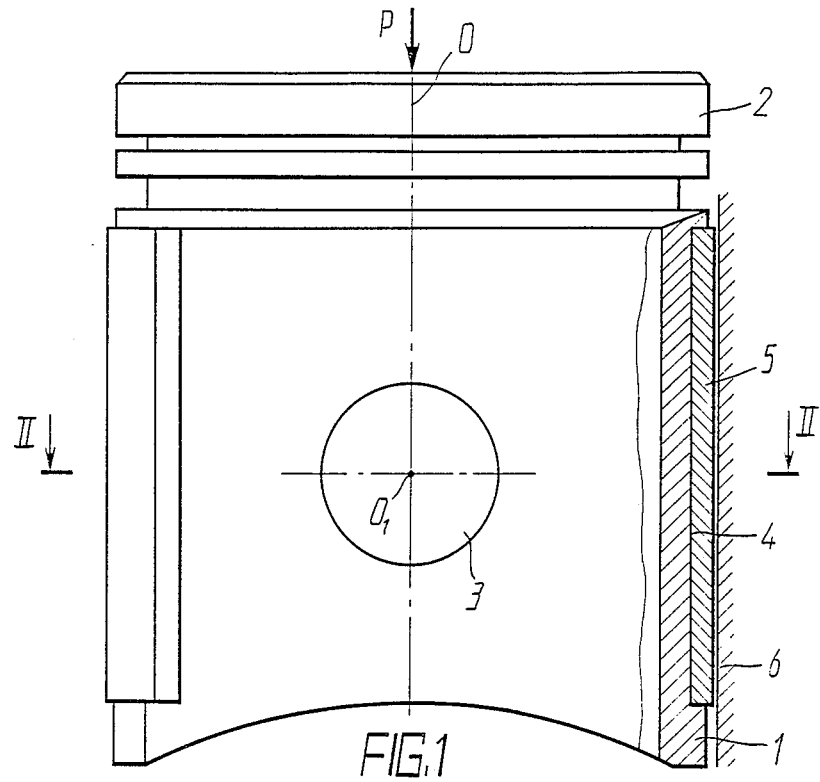
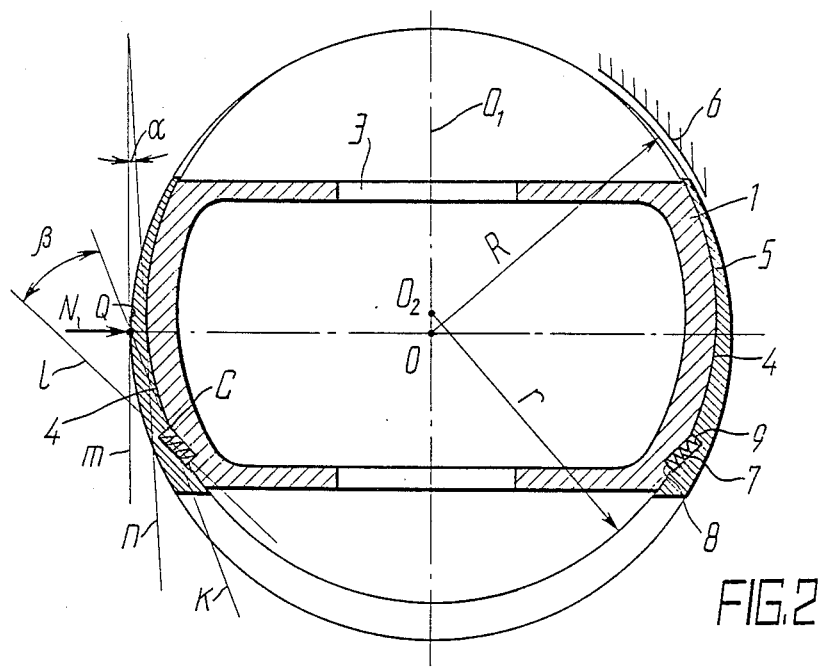

PISTON OF AN INTERNAL COMBUSTION ENGINE

FIELD OF THE INVENTION

This invention relates to internal combustion engine construction, and more particularly to improvement in a piston of an internal combustion engine.

BACKGROUND OF THE INVENTION

It is known that wobbling of pistons in internal combustion engines reduces the pressure sealing capacity of piston rings which tend to be drawn together as the piston wobbles and form clearances wherethrough gases rush from the combustion chamber to the crankcase of the engine.

For obviating piston wobbling it is necessary to minimize the clearance between the piston skirt and cylinder and thereby ensure that the piston moves inside the cylinder so that the axes of the piston skirt and cylinder would align, that is the piston skirt would move without skewing.

There is known a piston of an internal combustion engine, which provides coaxial movement of the piston skirt in the cylinder through the use of a fluoroplastic insert secured between the skirt and cylinder in a recess made in the side surface of the piston skirt (U.S., A, No. 4,158,328). The fluoroplastic insert has in cross section the form of a wedge tapering in a direction away from the piston head. The length of the recess is greater than that of the insert, and the insert is therefore capable of moving axially of the skirt from one extreme position to another. Clearances are present between the end faces of the insert and recess in such extreme positions assumed by the inserts.

However, the clearance between the cylinder and piston skirt is eliminated when the piston moves in a direction from the bottom dead center to the top dead center thus jamming the insert in the clearance, whereas the reverse travel of the piston from the top dead center to the bottom dead center causes the insert to get loose, whereby a clearance is formed between the piston skirt, insert and cylinder to result in piston wobble, faster wear and shorter service life of the piston. In addition, in the course of operation the insert tends to wear in terms of its thickness, and the clearance between the insert and the lower end face of the recess gradually diminishes. In the absence of this clearance the insert fails to function, whereby it becomes impossible to eliminate the clearance between the piston skirt and cylinder.

There is also known a piston of an internal combustion engine in which the insert acts to eliminate the clearance between the piston skirt and cylinder irrespective of the direction of movement of the piston (Deutsches Reich, A, 393,755).

The piston comprises a skirt having a piston pin hole the axis of which is perpendicular to the axis of the skirt; the side surface of the skirt having two recesses at the opposite sides of the pin hole axis with cylindrical surfaces the axes of which are parallel with the axis of the piston skirt, each such recess accommodating an insert having a cylindrical outer surface engageable with the surface of the engine cylinder having a curvature radius substantially equal to the radius of the cylinder and with the inner cylindrical surface of a curvature radius equal to the curvature radius of the recess, and two springs each disposed between the insert and piston skirt for the spring force to urge the insert to the cylinder.

In cross section the insert has a continuous thickness, since it is confined by the arcs of two concentric circles. This insert is secured in a recess with a clearance between its inner surface and the surface of the recess. The insert and recess are of equal length, which prevents the movement of the insert in the recess relative to the piston skirt axially thereof. In addition, the insert is linked with the piston skirt by a dowel to prevent it from turning about the axis of the piston skirt.

Each spring is accommodated in the respective recess between the insert and piston skirt so that its axis runs radially, whereby the radially directed spring force acts to urge the insert to the wall of the cylinder.

In view of the aforedescribed, the insert is urged by the spring exclusively in the radial direction thus eliminating the clearance between the piston skirt and cylinder and ensuring axial alignment during the travel of the piston inside the cylinder with the aim of reducing piston wobble.

However, such an arrangement of the spring necessitates a spring force exceeding the side pressure exerted on the piston. Despite the fact that the side forces exertable on the piston amount to between one fourth and one fifth of the axial (working) force imparted to the piston, they are still quite high. It is therefore necessary to use a spring of high compression force. As the piston operates and as the insert wears out, the force imparted by the spring to the insert tends to reduce to result in a shorter service life of the piston. This is accompanied by an increase in the clearance between the insert and the surface of the recess to result in disturbed coaxiality of the movement of the piston inside the cylinder and consequently in a tendency of the piston to wobble.

SUMMARY OF THE INVENTION

It is the aim of the present invention to provide a piston of an internal combustion engine having such an insert which would be capable to completely eliminate a clearance between the piston skirt and cylinder irrespective of the wear of the insert and cylinder, prevent wobbling of the piston, and thereby extend its service life.

The aim is attained by that in a piston of an internal combustion engine comprising a skirt with a hole to receive a piston pin the axis of which is perpendicular to the axis of the skirt the side surface of which is provided with two recesses arranged at the opposite sides of the piston pin hole axis and having cylindrical surfaces with axes thereof parallel with the axis of the skirt, each pin receiving an insert having an outer cylindrical surface engageable with the surface of the cylinder of the internal combustion engine, this outer cylindrical surface having a radius of curvature equal to the radius of the cylinder of the internal combustion engine, and having an inner cylindrical surface of a radius of curvature equal to the radius of curvature of the recess, and two springs each disposed between the corresponding insert and skirt for the force of the spring to urge the insert to the cylinder, according to the invention, cross-sectionally the insert has the form of a curvilinear wedge having a maximum angle not exceeding the angle of friction thereof, the inner surface of the insert engaging with the cylindrical surface of the recess the axis of which is offset from the axis of the skirt axially of the piston pin hole axis in the direction of taper of the wedge by a magnitude equal to the product of the radius of curvature of the inner surface of the insert by the maximum angle of the wedge, the spring being so disposed that the angle between the direction of force produced by the spring and a tangent line to the inner surface of the corresponding insert at the point of application of this force toward the wedge taper is less than 90°.

The arrangement of the insert in the form of a curvilinear wedge makes it possible to completely eliminate the clearance between the piston skirt and cylinder irrespective of the extent of wear of the insert and cylinder, since in the course of wear the insert is caused to turn about the axis of the skirt on the surface of the recess under the action of the spring thus eliminating the clearance, which prevents the tendency of the piston to wobble. By virtue of the fact that the maximum wedge angle of the insert is less than the angle of friction thereof, turning of the insert requires a relatively small force. It is therefore possible to use a spring of low compression force. Another advantage is less rigid requirements to the strength of the material of the insert accompanied by more pronounced antifriction properties, whereas the piston can be fabricated from a stronger heat-resistant material.

The aforedescribed enables to extend five-fold the service life of the piston of an internal combustion engine.

BRIEF DESCRIPTION OF THE DRAWINGS

The invention will now be described in greater detail with reference to a preferred embodiment thereof taken in conjunction with the accompanying drawings, in which:

FIG. 1 is a partially sectional view of a piston of an internal combustion engine according to the invention; and FIG. 2 is a section taken along the line II—II in FIG. 1.

BEST MODE OF CARRYING OUT THE INVENTION

A piston of an internal combustion engine comprises a skirt 1 (FIG. 1) with a head 2 an outside surface of which has two portions of cylindrical shape with a common axis "O" coinciding with the axis of the skirt 1. Provided in the midportion of the skirt 1 is a hole 3 to receive a piston pin (not shown) with an axis "$O_1$" thereof being perpendicular to the axis "O" of the skirt 1. Arranged at the outer surface of the skirt 1 at the opposite sides of the axis "$O_1$" are two recesses which receive inserts 5, the length of each such insert 5 being equal to the length of the recess 4.

The insert 5 (FIG. 2) has a convex cylindrical outer surface engageable with the inner surface of a cylinder 6 (shown schematically in FIGS. 1 and 2) of the internal combustion engine. R—radius of curvature of the outer surface of the insert 5 is the same as the radius of the cylinder 6 of the engine. The inner surface of the insert 5 engageable with the surface of the recess 4 is concave, whereas r—radius of curvature of the inner surface of the insert 5 is equal to the radius of curvature of the surface of the recess 4.

A compression spring 7 (FIG. 2) is provided between each insert 5 and skirt 1, this spring 7 being thrust by one end against a shoulder 8 provided on the skirt 1 and by the other end against a shoulder 9 provided on the insert 5.

The insert 5 has in cross-section the form of a curvilinear wedge, the maximum angle α of this wedge not exceeding the angle of friction of the insert 5. This angle α is generally an angle between tangent lines "m" and "n" to the outer and inner surfaces of the insert 5, respectively, at a point Q of application of the lateral component N of the force P (FIG. 1) exerted on the piston along the axis "O".

The insert 5 can be fabricated from a material featuring high antifriction properties, such as metal ceramics, fluoroplastic, or other known material generally employed for making piston inserts.

As is known, for most of the materials the maximum angle of friction is approximately 6°. The angle of friction is determined from tables found in reference literature, and depends on the material of friction pairs and other factors, such as lubricants, surface cleanness, type and character of loads exerted thereon, etc.

The maximum wedge angle α (FIG. 2) of the insert 5 is not to exceed the angle of friction of the insert 5, and should preferably ensure its self-braking in the recess 4 under the action of the component N of the force P. If the wedge angle α is greater than the angle of friction, then under the action of the component N the insert 5 will tend to be arbitrarily pushed from the recess 4 to necessitate spring 7 of a higher rigidity.

When selecting the wedge angle of the insert 5, it is desirable to take into consideration the type (uniformly distributed or concentrated) and character (continuous, oscillating, variable-sign) of load.

Favourably, this angle is less than the angle of friction. For example, with respect to the "piston-cylinder" friction pair the friction coefficient should preferably range from 0.07 to 0.85, which corresponds to an angle of friction of 4° to 5°.

If for structural considerations it is necessary to have a different angle of friction, conditions of lubrication, surface roughness and the spring force direction should be such as that self-braking of the insert 5 in the recess 4 would be ensured during operation of the piston under load.

The inner surfaces of the inserts 5 are in contact with the cylindrical surfaces of the recesses 4 having a common axis "$O_2$" parallel with the axis "O" of the skirt 1. The axis "$O_2$" of the recesses 4 is offset from the axis "O" of the skirt 1 along the axis "$O_1$" of the piston pin hole 3 in the direction of the taper of the wedge by a magnitude equal to the product of r-radius of the recess by α—the maximum angle of the wedge, that is the distance $O_2O = r.d$, where α is expressed in radians, since for small angles within the angle of friction tg α ≈ α. Therefore, the recess 4 has in cross section a shape conforming to the shape of the insert 5. The spring 7 is so disposed that the angle β between the direction of force of the spring 7 coinciding with its axis "l" and tangent line "k" to the inner surface of the insert 5 at the point of application of this force, viz., at the point "C" of contact of the spring 7 with the inner surface of the insert 5, is always less than 90°, which provides for the movement of the insert 5 toward its taper as it wears out in the recess 4.

The proposed piston of an internal combustion engine operates in the following manner.

During reciprocating motion of the skirt 1 (FIGS. 1 and 2) of the piston inside the cylinder 6 of the internal combustion engine the insert 5 received by the recess 4 is caused under the action of the spring 7 to eliminate the clearance between the skirt 1 of the piston and cylinder 6 and engages by the entire outer surface thereof with the inner surface of the cylinder 6, and by the entire inner surface with the surface of the recess 4 of the skirt 1.

Therewith, the insert 5 fails to move in the recess 4 longitudinally, that is along the axis "O" of the skirt 1, whereby only the outer surface thereof is subject to wear, this surface tending to move relative to the inner surface of the cylinder 6 in the course of movement of the piston.

As the insert 5 wears out, the clearance between the insert 5 and cylinder 6 fails to appear, since the spring 7 acts to continuously force the insert 5 in the recess 4 toward its taper, and urge the insert 5 to the cylinder 6 thereby ensuring the movement of the piston in the cylinder 6 without wobbling. The force of the spring 7 is preferably to be greater than the force of friction between the insert 5 and skirt 1 of the piston, this latter friction force being negligeable compared with the force of friction between the cylinder 6 and outer surface of the insert 5. In view of the aforedescribed, the proposed construction of the piston of an internal combustion engine enables to virtually completely eliminate a clearance between the skirt 1 and cylinder 6 throughout the service life of the piston regardless of the extent of wear of the insert 5 and cylinder 6 of the internal combustion engine. This eventually results in a longer service life of the piston.

INDUSTRIAL APPLICABILITY

The herein proposed piston of an internal combustion engine can be used in all types of internal combustion engines, and in compressors.

I claim:

1. A piston of an internal combustion engine comprising a skirt (1) with a hole (3) to receive a piston pin the axis ($O_1$) of which is perpendicular to the axis (O) of the skirt (1) the side surface of which is provided with two recesses (4) arranged at the opposite sides of the piston pin hole axis ($O_1$) and having cylindrical surfaces with axes thereof parallel with the axis (O) of the skirt (1), each pin receiving an insert (5) having an outer cylindrical surface engageable with the surface of the cylinder (6) of the internal combustion engine, this outer cylindrical surface having a radius of curvature equal to the radius of the cylinder (6) of the internal combustion engine, and having an inner cylindrical surface of a radius of curvature of the recess (4), and two springs (7) each disposed between the corresponding insert (5) and skirt (1) for the force of the spring to urge the insert (5) to the cylinder (6), characterized in that cross-sectionally each insert (5) has the form of a curvilinear wedge having a maximum angle not exceeding the angle of friction thereof, the inner surface of the insert (5) engaging with the cylindrical surface of the recess (4) the axis ($O_2$) of which is offset from the axis (O) of the skirt (1) axially of the piston pin hole axis ($O_1$) in the direction of taper of the wedge by a magnitude equal to the product of the radius (r) of curvature of the inner surface of the insert (5) by the maximum angle ($\alpha$) of the wedge, each spring (7) being disposed so that the angle ($\beta$) between the direction of force produced by the spring (7) and a line (K) tangent to the inner surface of the corresponding insert at the point of application of this force toward the wedge taper is less than 90°.

* * * * *